(12) United States Patent
Figueras et al.

(10) Patent No.: US 7,851,401 B2
(45) Date of Patent: Dec. 14, 2010

(54) TUNGSTEN CATALYSTS

(75) Inventors: Francois Figueras, Lyons (FR); Nadine Essayem, Saint Just Chaleyssin (FR); Cyril Feche, Villeurbanne (FR); Stephane Loridant, Meyzieu (FR); Jorge Palomeque, Tlanep (MX); Georges Gelbard, Caluire (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 1029 days.

(21) Appl. No.: 10/519,498

(22) PCT Filed: Jul. 1, 2003

(86) PCT No.: PCT/FR03/02040

§ 371 (c)(1),
(2), (4) Date: Sep. 29, 2005

(87) PCT Pub. No.: WO2004/004893

PCT Pub. Date: Jan. 15, 2004

(65) Prior Publication Data

US 2006/0091045 A1    May 4, 2006

(30) Foreign Application Priority Data

Jul. 3, 2002 (FR) .................................. 02 08318

(51) Int. Cl.
*B01J 23/00* (2006.01)
*B01J 8/00* (2006.01)
*C10G 17/00* (2006.01)
*C10G 45/00* (2006.01)
*C10G 45/04* (2006.01)
*C10G 45/60* (2006.01)
*C10G 29/00* (2006.01)
*B01D 53/48* (2006.01)
*B01D 53/56* (2006.01)
*C01B 7/00* (2006.01)

(52) U.S. Cl. .................... 502/305; 502/313; 502/315; 502/316; 208/208 R; 208/216 R; 208/216 PP; 208/243; 423/244.02

(58) Field of Classification Search ................ 502/305, 502/313, 315, 316
See application file for complete search history.

(56) References Cited

U.S. PATENT DOCUMENTS 2,739,132 A    3/1956    Riedl
3,474,042 A    10/1969   Petrini
5,543,036 A    8/1996    Martenak et al.

FOREIGN PATENT DOCUMENTS

GB    1 249 079      10/1971
WO    WO 01 48119    7/2001

OTHER PUBLICATIONS

J.C. Yori et al. "n-butane isomerization on tungsten oxide supported on zirconia". Applied Catalysis A: General 163 (1997) 165-175.*

(Continued)

*Primary Examiner*—Jerry Lorengo
*Assistant Examiner*—Jennifer A Smith
(74) *Attorney, Agent, or Firm*—Young & Thompson (57) ABSTRACT

The invention concerns solids comprising a single tungsten oxide layer on a zirconia support and/or titanium dioxide support, characterized in that the tungsten exhibits tetrahedral co-ordination, before and after calcining. The invention also concerns the method for preparing the solids, and their uses as acid catalysis reactions catalyst.

30 Claims, 3 Drawing Sheets

OTHER PUBLICATIONS

Vaudagna et al. "Influence of the tungsten oxide precursor on WOx-ZrO2 and Pt/WOx-ZrO2 properties" Applied Catalysis A: General 164 pp. 265-280 (1997).*

Barton et al. "Structure and Electronic Properties of Solid Acids Based on Tungsten Oxide Nanostructures". J. Phys. Chem. B 1999, 103, 630-640.*

Salvati et al. "Surface spectroscopic study of tungsten-alumina catalysts using x-ray photoelectron, ion scattering, and raman spectroscopies". J. Phys. Chem. 1981, 85, 3700-3707.*

Parera, J.M. et al., "n-butane isomerization on tungsten oxide supported on zirconia", *Applied Catalysis A: General*, Elsevier Science, Amsterdam, NL, vol. 163, No. 102, Dec. 5, 1997, pp. 165-175.

Sohn, Jong Rack et al., "Characterization of zirconia-supported tungsten oxide catalyst", *Langmuir*, vol. 14, No. 21, 1998, pp. 6140-6145, XP002234339.

Vuurman, M.A. and Wachs, I.E., "Structural determination of supported V2O5-WO3/TiO2 catalysts by in situ Raman spectrometry and X-ray photoelectron spectroscopy", *Journal of Physical Chemistry*, vol. 95, No. 24, 1991, pp. 9928-9938, XP002234340.

* cited by examiner

TUNGSTEN CATALYSTS

The present invention relates to a new tungsten-based catalyst on a zirconia and/or titanium dioxide support, the process of preparation thereof and the applications thereof as a catalyst for chemical reactions, in particular in the petrochemical field, in particular refinery.

Zirconium oxide or zirconia ($ZrO_2$) is a solid which is widely used in catalysis. Amongst the physical properties which make it particularly suitable for this application are its high melting point (3003 K), low thermal conductivity and high resistance to corrosion by acids.

With regard to the chemical properties, zirconia is an amphoteric support, as is alumina, that can be used in oxidation and reduction reactions. Crystallisation and sintering of the crystallites by means of calcination are not desirable for use as a support.

It is known that zirconia develops acidic properties by means of sulphatation and is active in the isomerisation of paraffins. The specific surface-area improves the catalytic activity. This surface-area can be increased by the pH of precipitation. Various crystallographic phases are observed during the calcination of zirconia: tetragonal and monoclinic phases.

Zirconia can be synthesised by various means, such as precipitation in an aqueous solution of zirconium salts, such as $ZrOCl_2.8H_2O$, $ZrO(NO_3)_2.2H_2O$, $ZrCl_4$, or the sol-gel method.

Tungsten/zirconia ($W-ZrO_2$) catalysts have been known for some time and provide an alternative to reactions which are catalysed by means of acid sites. The advantage which these solids have compared with sulphates is that they do not lose the dopant during heat treatment and they are deactivated to a lesser extent. They have been described by Hino and Arata (*J. Chem. Soc., Chem. Commun.*, (1979), 1148) as strong acid catalysts. The definition as a superacid which was initially adopted has been downgraded and it is now commonly accepted that they are strong acids which are capable of isomerising linear paraffins into isoparaffins at approximately 523 K. Since the acid sites have not been able to be identified, these solids are characterised by a chemical composition and a method of preparation.

The solid described by Hino and Arata, obtained by impregnating zirconia with ammonium metatungstate must be subjected to activation at a temperature of between 1073 K and 1123 K in order to be able to be used as a catalyst for the isomerisation of paraffins. Other patents (U.S. Pat. Nos. 2,739,132, 3,474,042) further disclose catalysts of this type which are produced by impregnation, on various supports, such as silica, clays, etc.

Kresge et al. (U.S. Pat. No. 5,902,767) described a catalyst which is active after calcination at 873 K since it contains small quantities of copper. Soled et al. (U.S. Pat. No. 5,113,034), on the other hand, prepared a solid with sulphate or tungstate and produced a solid which is active after calcination between 450° C. and 800° C. In fact, the examples illustrate that the first calcination at 600° C. is followed by calcination at 800° C. before the catalyst is supplied. Subsequently, Soled (U.S. Pat. No. 5,648,589) distinguished himself from the works of Hino by impregnating the zirconia with a solution of silicate and tungstate.

In U.S. Pat. No. 5,510,309, Chang et al. claim a solid which is produced by means of co-precipitation of ammonium metatungstate and $ZrOCl_2$ used after calcination above 700° C., in fact 825° C. in the examples. This procedure produces an acid solid, to which platinum and iron can be added in order to provide a catalyst for the isomerisation of paraffins (U.S. Pat. No. 6,124,232), the dimerisation of olefins (U.S. Pat. No. 5,453,556) or reduction of nitrogen oxides.

At the present time, there is therefore no tungsten/zirconia catalyst which has a high content of tungsten and no additive and which is active after calcination at a temperature less than or in the order of 700° C., or even 600° C.

Furthermore, an important parameter to be taken into account in order to appreciate the catalytic activity of catalysts in various chemical reactions is the degree of acidity of the catalytic support. The structure of the solids which have already been described is the subject-matter of a number of works. The structure of the acid sites of these various solids is, however, still unknown.

Various authors indeed propose that the strong acid sites correspond to the formation of micro fields of tungsten trioxide ($WO_3$). This hypothesis allows several experimental observations to be reconciled: the increase in activity with the percentage of tungsten (20% above the most active), the need to heat the solid to a temperature where sintering begins to become evident, as well as the observation in the Raman spectrum of lines which correspond to the clusters of $WO_3$. E. Iglesia et al. (*J. Phys. Chem. B*, 103, (1999), 630-640) report that, on the tungsten/zirconia solid described in this publication, the isolated atoms of tungsten are in a deformed octahedral environment and that there is no tetrahedral tungsten in the case of a tungsten/zirconia solid. This dominant viewpoint is repeated in a publication of M. Scheithauer et al. (*J. Catal.*, 180, (1998), 1-13).

J. M. Parera et al. (*Applied Catalysis A: General*, Elsevier Science, 163 (1-2), (May 12, 1997), 165-175) present catalysts based on tungsten oxide on a zirconia support which are prepared starting from solutions of ammonium metatungstate at a pH of 6 or greater. The tungsten, which is in the form of a single layer on the support, has tetrahedral types but also octahedral types which become dominant when the proportion of tungsten deposited increases.

Sohn and Park (*Langmuir*, 14, (1998), 6140) prepared $WO_3/ZrO_2$ catalysts which contain only 5% of tungsten and which have a Raman line at 935 $cm^{-1}$ attributed to tetrahedral types. However, this band disappears and is replaced by a band which is attributed to the octahedral tungsten when the tungsten content increases to 13%. Furthermore, a band at 808 $cm^{-1}$ indicates the presence of microcrystals of $WO_3$. Furthermore, the catalysts have a relatively weak acidity.

It can be determined from this that current tungsten/zirconia catalysts substantially comprise octahedral tungsten, probably owing to the process of preparation thereof which is based on the use of metatungstates which decompose into $WO_4^{2-}$ ions only at a very basic pH at which the zirconia does not fix anions. The significant chemical properties, including the acidity, and the catalytic properties however depend on the coordination of the active atoms: it is anticipated that the tetrahedral types will have a stronger acidity and more selective catalytic properties.

Another oxide, titanium oxide, has superficial properties which are similar to that of zirconia. Zirconia and titanium dioxide are both basic and non-soluble in an acid medium and therefore exchange stable anions. Furthermore, these oxides can be mixed together so that the mixed oxides zirconia/titanium dioxide have similar properties, and in particular similar surface properties, with respect to those of pure oxides.

The object of the invention is therefore to provide new tungsten catalysts on a zirconia and/or titanium dioxide support which do not have the disadvantages mentioned above, in particular when they are used in the catalytic reactions envisaged.

More precisely, one object of the present invention consists in providing tungsten/zirconia and/or titanium dioxide catalysts with a high level of acidity, in particular, greater than the tungsten/zirconia catalysts known at present.

A further object of the present invention is to provide new tungsten/zirconia and/or titanium dioxide catalysts which have improved catalytic properties compared with the catalysts of the prior art and, more particularly, improved properties in terms of selectivity and/or kinetics and/or efficiency.

A further object of the present invention consists in providing new tungsten-based catalysts supported on zirconia and/or titanium dioxide which allow the catalysis of reactions of oxidation, epoxidation, hydrodesulphuration, isomerisation and others, which reactions are carried out in particular on products originating from the petrochemical industry.

Other objectives will be appreciated from the following description of the invention.

The invention thus first relates to a solid which comprises a single layer of tungsten oxide on a zirconia and/or titanium dioxide support, characterised in that the tungsten has tetrahedral coordination, before and after calcination.

The invention more specifically relates to a solid comprising a single layer of tungsten oxide on a zirconia and/or titanium dioxide support, characterised in that:

a) the tungsten has tetrahedral coordination, before and after calcination;
b) the specific surface-area of the solid, after heating to a temperature of less than 800° C., preferably less than 700° C., in particular, less than or in the order of 600° C., is between 50 and 300 m²/g, more particularly between 65 and 200 m²/g, advantageously between 86 and 150 m²/g.

The invention more particularly relates to a solid comprising a single layer of tungsten oxide on a zirconia and/or titanium dioxide support, characterised in that:

a) the tungsten has tetrahedral coordination, before and after calcination;
b) the specific surface-area of the solid, after heating to a temperature of less than 800° C., preferably less than 700° C., in particular, less than or in the order of 600° C., is between 50 and 300 m²/g, more particularly between 65 and 200 m²duct/g, advantageously between 86 and 150 m²/g;
c) the solid has a total acidity, measured by means of adsorption of ammonia, of between 0.1 and 0.5 mmol/g, preferably between 0.2 and 0.4 mmol/g, advantageously of approximately 0.35 mmol/g of solid, after heating to a temperature of less than 800° C., preferably less than 700° C., in particular, less than or in the order of 600° C.

By "single layer", a single molecular layer of tungsten oxide should be understood, with no formation of crystals of the oxide. The presence of crystals of tungsten trioxide ($WO_3$), which has tungsten in the form of octahedral coordination, is not suitable for the solid according to the present invention.

The tetrahedral coordination of tungsten is confirmed by Raman spectrometry, a line of resonance at 935 cm$^{-1}$, maintained after calcination at a temperature in the order of 600° C., or greater than 700° C. The lines of resonance towards 800 cm$^{-1}$ and 1000 cm$^{-1}$ which are characteristic of octahedral tungsten and microcrystals of $WO_3$ are absent from the Raman spectrum of the solid according to the present invention.

The solid according to the present invention comprises tungsten in the oxidised form deposited in a single layer on a zirconia and/or titanium dioxide support. By zirconia and/or titanium dioxide support, it should be understood that the support can be constituted by pure zirconia or pure titanium dioxide or a mixture of zirconia and titanium dioxide in any proportions.

In the solid according to the present invention, the quantity of tungsten deposited on the support is between 0.5% by weight and 80% by weight, advantageously between 1% and 40%, preferably between 2% and 25% by weight relative to the total mass of the solid.

According to a preferred embodiment of the present invention, the solid comprises a single layer of tungsten in the form of tetrahedral types in a quantity of between 5% by weight and 25% by weight, advantageously between 10% and 25%, preferably between 15% and 25% by weight relative to the total mass of the solid.

The solid according to the invention has extremely advantageous catalytic properties and also has the advantage, compared with catalysts known from the prior art, of being able to be used without having been subjected to prior calcination which is generally required to activate the catalyst. However, it is possible to thermally activate the solid according to the invention and, in this case, a calcination temperature of less than 800° C., more particularly less than 700° C., and advantageously in the order of or less than approximately 600° C. is sufficient. This temperature also corresponds to the temperature which is sufficient to regenerate the catalyst.

The solid of the invention can, of course, be calcined (activated and/or regenerated) at higher temperatures, such as those which are usually found for tungsten/zirconia catalysts of the prior art, which temperatures are generally in the order of or greater than 800° C. However, it will be appreciated that there is a significant economic and environmental advantage in having catalysts whose activation and/or regeneration temperatures are relatively low, in particular lower than the temperatures of the catalysts available at present.

The solid according to the present invention can further comprise one or more metals known for their catalytic activities, such as, for example, platinum, palladium, rhodium, cobalt, nickel, iron, etc. For example, palladium or platinum can therefore advantageously be added to the solids of the invention in order to catalyse hydrogenation reactions, for example, hydrogenation of aromatic compounds of fuels into naphthenes.

The present invention also relates to a process for preparing the tungsten/zirconia and/or titanium dioxide solid, characterised in that a single layer of $W_4^{2-}$ ions is deposited on a zirconia and/or titanium dioxide support.

The means for producing such supported types has been found by using an exchange of anions with zirconia. Amongst the compounds of tungsten, peroxotungstic acid ($H_2W_2O_{11}$) is stable in a highly acidic medium, which allows an ion exchange under good conditions. The use of this compound allows a single layer of tungsten to be produced at the surface of the support, for example, 20% by weight of tungsten, with an initial support surface-area of approximately 300 m²/g in the case of a support of pure zirconia.

Very surprisingly, the solid produced using this technique has a significant Raman line at approximately 935 cm$^{-1}$ which can be attributed to the tetrahedral tungsten, with no bands at 1000 cm$^{-1}$, nor at 800 cm$^{-1}$ which can be attributed to the octahedral microcrystals of tungsten trioxide ($WO_3$). It should further be noted at this point that these spectrums are produced after heating in air at 600° C.

More particularly, the process according to the present invention is characterised in that it comprises the step of:

a) oxidising tungstic acid into peroxotungstic acid ($H_2W_2O_{11}$)

b) exchange of anions in an acid medium preferably less than pH 3 between the solution of peroxotungstic acid obtained in this manner and a hydrated zirconia ($ZrO_2$) and/or hydrated titanium dioxide ($TiO_2$) support; and c) recovering the tungsten/zirconia and/or titanium dioxide solid.

In the first step a), the oxidation of the tungstic acid can be carried out in various manners, advantageously under the action of hydrogen peroxide without, however, being limited to this oxidation agent. According to one alternative, it can be advantageous to oxidise hydrated tungsten trioxide ($WO_3$) in dilute 10% to 80% hydrogen peroxide, preferably 15% to 60%, for example, 30%. Other methods can further be used in so far as they lead to the formation of $WO_4^{2-}$ anions, only then able to be exchanged with hydrated zirconia and/or hydrated titanium dioxide in an acid medium, preferably less than pH 3, whilst maintaining a tetrahedral structure.

The process according to the invention allows a highly acidic peroxotungstic acid ($H_2W_2O_{11}$) to be produced having a pH less than 3, and with the feature of being readily fixed to a zirconia and/or titanium dioxide support. Zirconium dioxide, titanium dioxide and the mixtures thereof have properties of being amphoteric solids and anion exchangers in this acidic range (pH<3).

It should be understood that other metal oxides having the properties required for the solids of the invention and of the type defined above can also form suitable supports and consequently are also part of the present invention.

According to a particularly preferred embodiment, the process of the present invention uses a support comprising pure zirconia, that is to say, with no titanium dioxide. However, the invention is not limited to this single type of support and also comprises solids having a support of pure $TiO_2$, that is to say, with no zirconia, but also solids whose support comprises a mixture of zirconia and $TiO_2$ in any proportions. Fillers, additives and the like which are known to the person skilled in the art can also be added to the oxide or to the mixture of oxides which form the support of the solids according to the invention.

Up to the present time, the precursors used in order to fix the tungsten to a support, such as zirconia, were ammonium metatungstates [$(NH_4)_6H_2W_{12}O_{40}$], for which it is known from general mineral chemistry works (for example, that of P. Pascal) that the tungsten was engaged in a Keggin structure formed by octahedrons. However, this structure is converted into a tetrahedral $WO_4^{2-}$ structure only at very basic pH values, at which pH values zirconia does only exchange cations.

It has surprisingly been found that, according to the process of the present invention, peroxotungstic acid decomposes at the surface of the support into mononuclear tetrahedral types. This consequently favourably modifies the acidic properties of the catalyst produced.

A highly acidic catalyst significantly improves the properties, such as, for example, those relating to kinetics, selectivity and efficiency, of a number of catalytic chemical reactions, in particular in the field of petrochemistry. In particular, the solid according to the invention has oxidation properties which are at present unknown with the usual catalysts in which tungsten dissolves more readily.

The present invention thus also relates to the use of the tungsten/zirconia and/or titanium dioxide solid as defined above as a thermally stable acid catalyst, oxidation and epoxidation catalyst or hydrodesulphurisation catalyst by means of the addition of nickel.

Other fields of application are, for example, the isomerisation of paraffins and olefins, hydrogenation of aromatics, oxidation in the liquid phase of sulphurised compounds or olefins, the bromation of olefins and in general all types of known reaction which are generally catalysed by octahedral tungsten/zirconia systems (isomerisation of linear paraffins into isoparaffins: Hino et al., *J. Chem. Soc., Chem. Commun.*, (1979), 1148), by means of tungsten/zirconia systems which have been modified by iron or to which platinum has been added (isomerisation of alkanes at low temperatures: Hsu et al., *Chem Commun.*, (1992), 1645) or by means of tungsten/hydrotalcite systems (de Vos et al., *Catal. Today*, 60, (2000), 209-218), to mention only a few of these reactions in a non-limiting manner.

It has surprisingly been found that the solid catalysts according to the present invention have catalytic properties which are far superior to the catalysts known from the prior art for the same type of reaction. These improved properties include, inter alia, the lowest temperature of activation, approximately 600° C. (or approximately 873 K) relative to temperatures in the order of 800° C. for the usual catalysts, which allows the specific surface-area of the catalyst to be increased, and therefore the efficiency thereof.

Whereas the solids produced in the prior art have an octahedral coordination of tungsten or microcrystals of tungsten trioxide, the tetrahedral coordination of the tungsten imparts a greater acidity to the solid according to the invention, and consequently better efficiency for reactions with acid catalysis (such as oxidation, epoxidation, etc).

Furthermore, the solid according to the present invention has a high degree of chemical and thermal stability which thus ensures a better suitability for regeneration of the solid.

The solids according to the invention can therefore particularly advantageously be used in catalytic oxidation reactions of sulphurous derivatives, in particular, those present in hydrocarbons before or after refinement. The solids according to the invention are thus particularly suitable for the desulphurisation of hydrocarbons, in particular fuels, for example, petroleums, kerosenes and gas oils. In particular, the solids according to the present invention have been found to be very effective catalysts in oxidation reactions of benzothiophenes and/or dibenzothiophenes, substituted or non-substituted.

Sulphurous compounds are particularly undesirable in liquid hydrocarbons. The presence of sulphur is associated with the corrosion of equipment and damage to combustion engines. Sulphur also poisons the metal catalysts used in the refinement of crude petroleum and the catalytic conversion of gaseous effluents. It is further recognised that the emission of sulphurous products into the atmosphere contributes to acid rain and the formation of ozone and the current specification of a maximum of 500 ppm of sulphur, particularly in gas oil, must be reduced to only a few ppm in the future which will require increasingly efficient processes.

Sulphurous compounds, such as sulphurs, bisulphurs and mercaptans, can be readily removed using inexpensive processes, but thiophenes, such as benzothiophene (BT), dibenzothiophenes (DBT) and the derivatives thereof, in particular the substituted derivatives, are more difficult to remove given that they are refractory molecules.

However, there are processes which allow the sulphur to be removed from crude petroleum and the derivatives thereof by means of hydrodesulphurisation of BT and DBT. However, the cost of these processes remains very high, mainly owing to the operating conditions, the consumption of hydrogen and the methods for post-processing the gases, such as the Claus method. Furthermore, the current techniques for desulphurisation of hydrocarbons need to be improved in order to provide products which have an even lower content of sulphur.

The fixed costs unfortunately increase significantly with the level of extraction. For this reason, alternative methods have been proposed, such as adsorption, biological processes and oxidation, this last technique being a low-cost alternative which may optionally replace hydrodesulphurisation.

In particular, the process of oxidation of the sulphurous compounds, such as BT and DBT, is in particular an alternative to hydrodesulphurisation since the compounds are oxidised into sulphoxides and sulphones, which are soluble in polar solvents and which can thus be readily extracted by physical means, as described in patent application WO 01/48119.

The oxidation of dibenzothiophene has been proved to be possible using basic catalysts, such as hydrotalcites, in the presence of hydrogen peroxide and a nitrile. However, these mixed oxides of magnesium/aluminium are not very effective owing to their high level of basicity which brings about the decomposition of the hydrogen peroxide.

The hydrotalcites in the state of rehydrated meixnerites are very active, oxidising DBT up to 98% in 30 minutes in liquid monophase systems, this conversion reaching 99% in 45 minutes in a 3 phase system. However, it is necessary to use compounds comprising a nitrile function which leads to sub-products (in particular acetamide) which are difficult to remove and which thus make it difficult to implement the process on an industrial scale.

It has surprisingly been found that the solids according to the present invention are much more active for the oxidation of thiophenes and derivatives, such as BT and DBT, substituted or non-substituted. Since the tetrahedral structure of tungsten is very stable, even at high temperatures, conversions in the order of 99% in 5 minutes have been able to be observed with hydrogen peroxide, and 70% after one hour with tert-butyl hydroperoxide (TBHP), which conversions are completely compatible with an industrial application. Even in the presence of nitrile solvent, the solids of the present invention lead to only slight or no formation of undesirable by-products.

The present invention therefore also relates to a process of desulphurisation by oxidising compounds or compositions containing sulphurous compounds, characterised in that it comprises the steps of:
a) bringing the compound or composition to be desulphurised into contact with an oxidising agent and a solid comprising a single layer of tetrahedral tungsten deposited on a zirconia and/or titanium dioxide support;
b) carrying out the oxidation reaction in a suitable solvent, preferably at atmospheric pressure and at a suitable temperature, preferably between 20° C. and the boiling temperature of the solvent;
c) removing the oxidation products from the initial compound or composition.

It must be understood that, in the above process, the zirconia and/or titanium dioxide support indicates a support based on zirconia, or based on titanium dioxide or based on a mixture of the two above-mentioned oxides in any proportions. Solids are preferred in which the support comprises pure zirconia, that is to say, with no titanium dioxide.

The compound or composition to be desulphurised should more particularly be understood to be the products originating from the distillation of crude petroleum, whether they are refined or not. Products of this type originating from the distillation of crude petroleum are, for example, hydrocarbons, in particular, fuels, especially, petroleums, kerosenes and gas oils, more specifically gas oils.

Sulphurous compounds must preferably be understood to be the thiophenic compounds which are usually present in products originating from the distillation of crude petroleum, such as, for example, benzothiophene (BT), dibenzothiophene (DBT) and the derivatives thereof, in particular the derivatives thereof substituted by one or more groups, selected in particular from alkyls, in particular methyl. The process according to the present invention has been found to be particularly advantageous, for example, for the oxidation of DBT and the substituted derivatives thereof, such as mono, di-, tri- or tetra-alkylbenzothiophenes.

Owing to the combination of the oxidising agent and the solid catalyst according to the invention, the atoms of sulphur of the thiophenic compounds are oxidised into sulphone groups. The sulphurous compounds produced in this manner can thus readily be removed from the reaction medium according to conventional techniques known per se, such as decantation, phase separation, distillation, etc.

The oxidising agent can also be of any type known to the person skilled in the art, and is advantageously selected from peroxides, in particular hydrogen peroxide or tert-butyl hydroperoxide. These oxidising agents can be used alone or in admixture.

In the same manner, the solvents will be selected in accordance with the compound or composition to be desulphurised and can, for example, be selected from water, alkanes, for example, hexane, heptane, octane, nonane, decane, alkanols, for example, 2-butanol, polar solvents in general, such as, for example, nitrites (acetonitrile), or cyclic ethers (tetrahydrofurane, dioxane). The selection of the solvent is linked to the nature of the reaction to be carried out and will thus particularly be guided by the considerations of non-toxicity which are generally required for industrial applications and having regard for the protection of the environment. It will be appreciated that mixtures of solvents can be used and also that the reaction can take place in a phase which is homogeneous, heterogeneous, monophase, bi-phase, or tri-phase. The compound or composition to be desulphurised can also be used as a solvent in the reaction.

It may further be advantageous for the sulphones to be extracted from the reaction medium as they are formed in order to shift the equilibrium of the reaction and thus increase the efficiency of the process. Although it is preferable to carry out the oxidisation reaction in a homogeneous medium, the use of polar solvent in a multi-phase reaction medium thus has the advantage of making the sulphones soluble and thus shifting the equilibrium as described above.

The ratio of the oxidant/compounds to be oxidised can vary by significant proportions, depending on the operating conditions, the nature of the oxidant, the compound to be oxidised, the solvent used and the level of conversion desired as well as the envisaged duration of the reaction. In this manner, the ratio of the oxidant/compounds to be oxidised can vary, for example, from 100/1 to 1/100, preferably from 100/1 to 1/1. Completely satisfactory results have been obtained with ratios of oxidant/compounds to be oxidised of between 20/1 and 1/1, more particularly of between 10/1 and 2/1.

The process of the invention has thus been found to be particularly effective for the oxidation of thiophenic compounds contained in gas oils, with rates of conversion into sulphones generally of between 80% and 99.9% depending on the operating conditions.

Consequently, the present invention also relates to fuels, in particular gas oils, which are desulphurised by the process of the present invention.

The following examples illustrate the objects of the present invention, without in any way limiting the invention.

EXAMPLE A

Preparation and Characterisation of the Solid Catalysts

EXAMPLE A1

Preparation of a Zirconia Support

The zirconia support is commercially available (for example, from MEL® Chemicals) or can also be prepared according to techniques known per se and, for example, according to the following operating method:

A precipitation of zirconium hydroxide is produced at pH=9, starting from 100 mL of a solution of 0.4M of $ZrOCl_2$, $8H_2O$ and a solution of liquid ammonia (28%). The suspension is aged for 2 hours, then separated by means of centrifuging, washed several times with deionised water until the chloride anions have been completely removed. The white gel produced is dried at 110° C. for 22 h, then crushed.

EXAMPLE A2

Preparation of the Catalyst

Tungsten/zirconia catalysts, with different proportions of tungsten have been prepared starting from zirconia which is produced using sol-gel and which is used in the hydrated state according to the following operating methods:

a) Preparation of $ZW_{0.1}600$

A solution of 0.1M tungstic acid is produced by diluting 6.25 g of tungstic acid in 250 mL of 35% hydrogen peroxide. The anionic exchange is then carried out between the solution of tungstic acid and the zirconium hydroxide. 75 mL of solution is used per 5 g of hydroxide, in the case examined, 10 g of zirconium hydroxide in 150 mL of tungstic acid solution. The mixture is agitated for 15 minutes, filtered, then placed in an oven at 80° C. for 24 hours. Finally, the solid is calcined in air (flow rate 20 $cm^3$/min) at 600° C. for 3 hours. This tungsten-containing zirconia contains 19.4% of tungsten.

b) Preparation of $ZW_{0.25}700$

A solution of 0.25M tungstic acid is prepared by diluting 15.62 g of tungstic acid in 250 mL of 35% hydrogen peroxide. The remainder of the preparation is identical to that of $ZW_{0.1}600$, the solid being calcined at 700° C. rather than 600° C. This tungsten-containing zirconia contains 19.8% of tungsten which shows that the equilibrium is entirely shifted towards fixing tungsten on zirconia.

c) Preparation of Zr-1, Zr-2, Zr-3 and Zr-4

For these catalysts, a commercial zirconia has been used which is available from MEL® Chemicals (reference MEL-CAT F20 922/1), and which has a specific surface-area of 309 $m^2$/g and is exchanged by means of a solution of 0.12M pertungstic acid at ambient temperature.

The solid (designated Zr-1 hereinafter) has been produced by using an excess of tungsten (50 mL of 0.1M solution per 2 g of solid). Catalysts Zr-2 to Zr-4, which are less concentrated, are produced by reducing the quantity of tungsten solution.

Solids Zr-1, Zr-2, Zr-3 and Zr-4 have thus been prepared and their proportions of tungsten W % (expressed as a percentage by weight of tungsten) are given in Table I below:

TABLE I

| Catalyst | W % |
|---|---|
| Zr-1 | 20.61 |
| Zr-2 | 2.14 |
| Zr-3 | 5.19 |
| Zr-4 | 10.17 | d) Preparation of a Catalyst which is Not in Accordance with the Invention (Comparative Example)

The catalyst $ZW_I$ has been prepared according to the method described by E. Iglesia et al., *J. Catal.*, 194, (2000), 175-187:

Hydrated zirconia (1 g) is impregnated at ambient temperature with 0.29 mL of metatungstate in aqueous solution (0.23 M) and is agitated for 1 hour. The resulting solid is dried for 12 hours at 110° C., then calcined at 800° C. for 3 hours in dry air (20 $cm^3 \cdot min^{-1}$). This solid contains 19.1% of tungsten and is designated $ZW_I$ hereinafter.

Physico-Chemical Characterisations of the Solids

The solid catalysts Zr-1 to Zr-4 have been analysed in terms of their physical and chemical properties, with the following results:

a) Diffraction of X Rays

The structure of these solids, confirmed by diffraction of X rays, is quite amorphous (absence of microcrystals of $WO_3$) with low proportions of tetrahedral zirconia shown by the wide band at 2θ equal to 30°.

b) Textural Properties

The adsorption isotherms of these solids are of type I corresponding to microporous samples. Analyses have been carried out using samples which have been impregnated and dried in a vacuum at 523 K. No calcination has been carried out before this treatment. The properties are summarised in Table II below:

TABLE II

| Catalyst | $S_{TOT,BET}$ ($m^2$/g) | $S_{microporous}$ ($m^2$/g) | $V_{microporous}$ (mL/g) |
|---|---|---|---|
| Initial zirconia | 308.8 | 188.3 | 0.085 |

TABLE II-continued

| Catalyst | $S_{TOT,BET}$ (m²/g) | $S_{microporous}$ (m²/g) | $V_{microporous}$ (mL/g) |
|---|---|---|---|
| Zr-1 | 295.5 | 111.5 | 0.044 |
| Zr-2 | 313.6 | 189.9 | 0.083 |
| Zr-3 | 349.3 | 195.1 | 0.087 |
| Zr-4 | 370.7 | 233.6 | 0.103 |

The incorporation of tungsten in the zirconia has the effect of increasing the textural properties for a proportion of tungsten varying from 2 to 10%, and reducing with a proportion of tungsten of 20%.

c) Raman Spectroscopy

Figure 1:
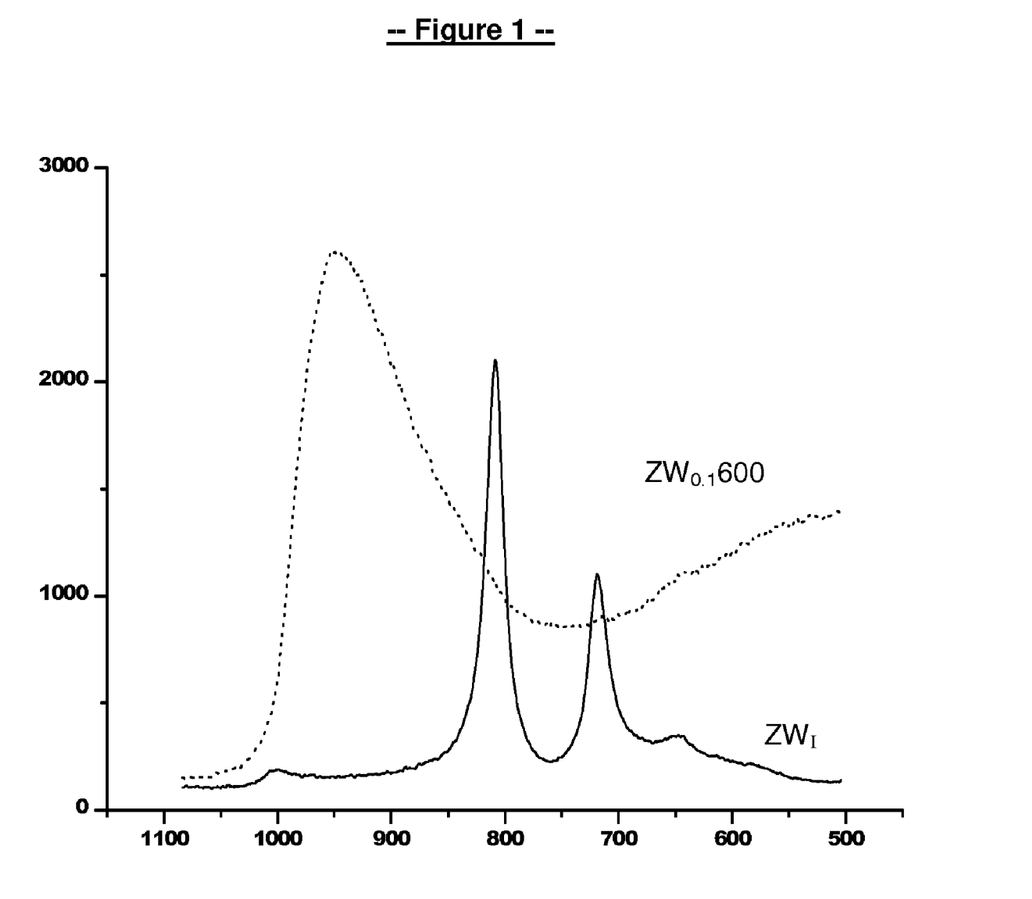
FIG. 1 represents the Raman spectrum of tungsten zirconia $ZW_{0.1}600$ prepared with a concentration of 0.1 M tungstic acid, then calcined at 600° C., and the Raman spectrum of the tungsten zirconia catalyst $ZW_1$ prepared according to the method described by E. Iglesia et al., J. Catal., 2000, 194, 175-187.

The Raman spectrum of the tungsten/zirconia solid $ZW_{0.1}600$ prepared with a concentration of 0.1M tungstic acid, then calcined at 600° C. is shown in FIG. 1. In the same FIG. 1, the Raman spectrum of the tungsten/zirconia catalyst $ZW_I$ has been illustrated.

FIG. 1 Illustrates:
- on the X axis, the wavelengths in $cm^{-1}$;
- on the Y axis, the amplitude of the signal;
- as a dotted line, the Raman spectrum of the catalyst $ZW_{0.1}600$; and
- as a solid line, the Raman spectrum of the catalyst $ZW_I$.

The band at 935 $cm^{-1}$ is attributed to the tetrahedral tungsten, whilst the solid $ZW_I$ shows the lines of the octahedral tungsten, in accordance with the publications of E. Iglesia et al. (cf. above)

d) Specific Surface-Area

Table III illustrates the influence of the temperature of calcination and the concentration of the tungstic acid solution on the BET surface-area and the size of the pores of the solids according to the present invention. This information is taken from the adsorption isotherms of nitrogen on the solids prepared starting from hydrated zirconia having a BET surface-area equal to 211 $m^2 \cdot g^{-1}$, and a mean pore diameter of 1.4 nm.

TABLE III

| | Concentration $H_2WO_5$ | | | |
|---|---|---|---|---|
| | 0.1 M | 0.25 M | 0.5 M | $ZW_I$ |
| T calcination: 600° C. | 96 $m^2 \cdot g^{-1}$ <br> Ø = 1.6 nm | 121 $m^2 \cdot g^{-1}$ <br> Ø = 1.7 nm | 125 $m^2 \cdot g^{-1}$ <br> Ø = 1.8 nm | |
| T calcination: 800° C. | 55 $m^2 \cdot g^{-1}$ <br> 4 < Ø < 7 nm | 44 $m^2 \cdot g^{-1}$ <br> 4 < Ø < 8 nm | 43 $m^2 \cdot g^{-1}$ <br> 4 < Ø < 8 nm | 44 $m^2 \cdot g^{-1}$ <br> 8 < Ø < 18 nm | e) Acidity of the Solids

The acidity of these solids has been measured by adsorption of ammonia, expressed in mmoles of ammonia per gramme of catalyst and in moles of ammonia per mole of tungsten. The results are summarised in Table IV below.

TABLE IV

| Catalysts | Tungsten (% by weight) | mmole $NH_3$/ g. of catalyst | mole $NH_3$/mole W |
|---|---|---|---|
| $ZW_{0.1}600$ | 19.4 | 0.35 | 0.33 |
| $ZW_{0.1}800$ | 19.5 | 0.32 | 0.30 |
| $ZW_I$ | 19.1 | 0.14 | 0.14 |

The catalyst of the invention has a number of acid sites, per gramme or mole of tungsten, which is double that of the catalyst $ZW_I$. This is consistent with the tetrahedral coordination of the tungsten of the solids of the present invention observed in Raman.

These acid properties also correspond to catalytic properties which are advantageous for the isomerisation of paraffins in which a platinum-tungsten/zirconia catalyst calcined at 600° C. shows activity and regenerates itself in a reversible manner (cf. Example C below).

EXAMPLE B

Example of Conversion of Dibenzothiophene into Sulphone

With each of the catalysts Zr-1, Zr-2, Zr-3 and Zr-4 previously described, tests are carried out relating to oxidation of dibenzothiophene (0.5 mmol) with hydrogen peroxide (5 mmol) in 10 mL of acetonitrile, at a temperature of 298 K (60° C.), and a quantity of catalyst of 0.1 g. The reactions are carried out in a reactor of 30 mL provided with a coolant and a septum for taking samples. The temperature is stabilised using an oil bath.

Figure 2:
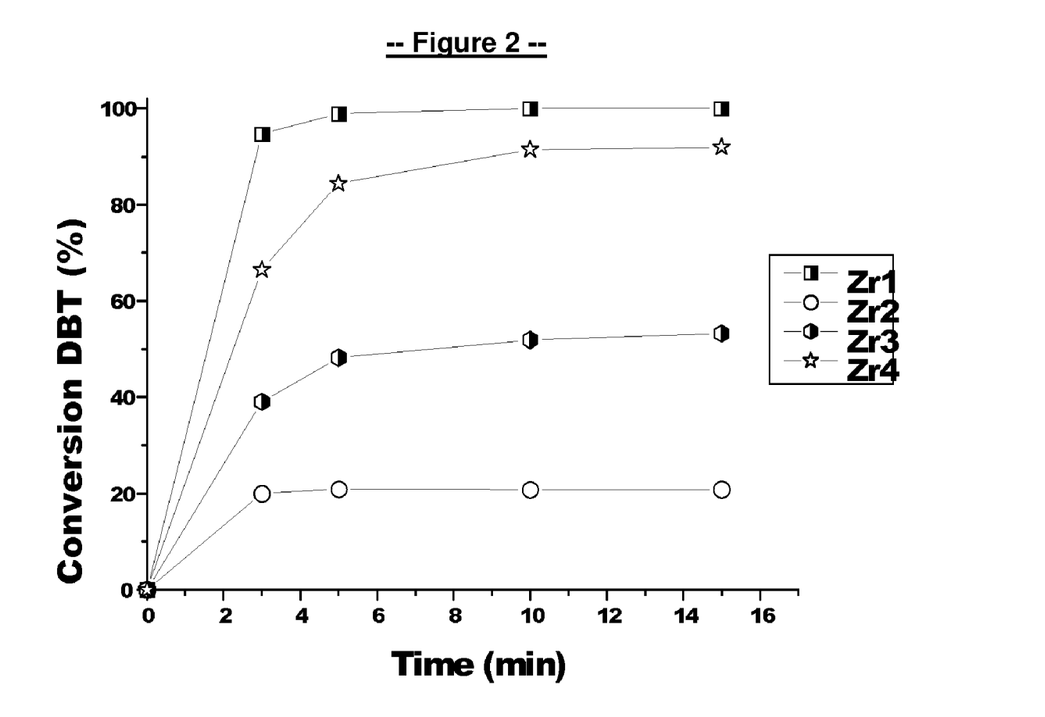
FIG. 2 represents the evolution of the conversion of DNT (dibenzothiopheme) into sulphone as a function of time with four catalysts prepared according to the invention Zr-1 (20.61% W); Zr-2 (2.14% W); Zr-3 (5.19% W); Zr-4 (10.17% W).

The results are shown in FIG. 2. The conversion of DBT into sulphone is produced with a degree of activity Zr-1>Zr-4>Zr-3>Zr-2, identical to that of the tungsten content in the catalysts. Equilibrium is achieved in 5 minutes with conversions of up to 99% for the solid Zr-1. This high level of activity is attributed to the tetrahedral tungsten formed starting from the peroxotungstic acid. No formation of acetamide (originating from the acetonitrile) was observed, indicating that the mechanism of the reaction is different to that of the known basic mechanisms.

Figure 3:
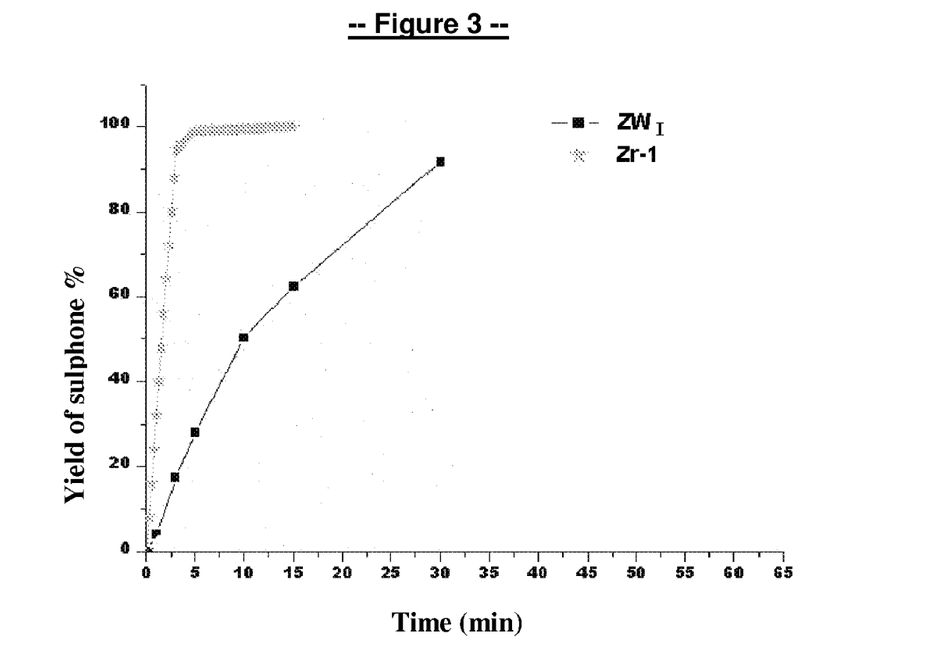
FIG. 3 represents the evolution of yield of sulphone as a function of time with two catalysts $ZW_1$ and Zr-1.

By way of comparison, a comparative test was carried out under the same conditions (DBT: 0.5 mmol, $H_2O_2$: 5 mmol, solvent: acetonitrile, reaction temperature: 60° C.), with 100 mg of catalyst $ZW_I$ calcined at 800° C. The percentage of conversion as a function of time is shown in FIG. 3 and clearly shows the superiority of the catalyst Zr-1 of the present invention.

Effects of the Concentration of Oxidant

Figure 4:
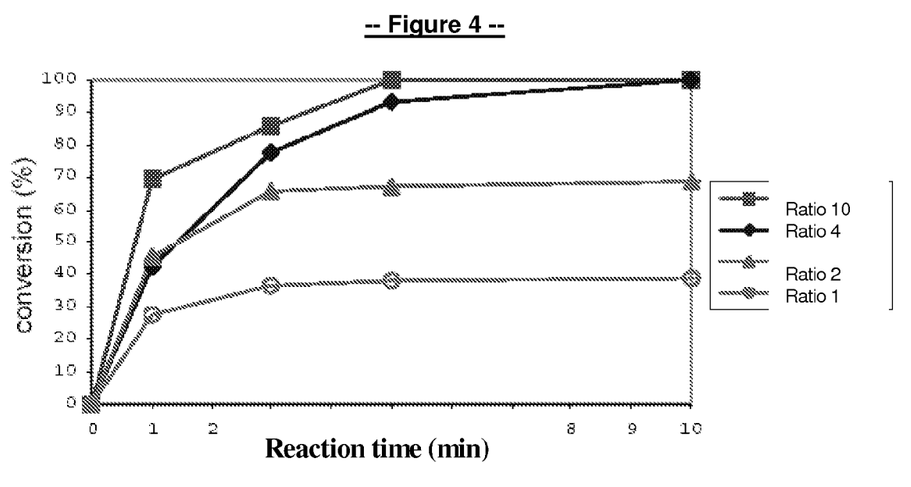
FIG. 4 represents the evolution of conversion of DBT into suphone as a function of time for ratio of oxidantlDBT of 1,2,4 and 10.

The use of high quantities of hydrogen peroxide has repercussions on the fixed costs of the process and it is therefore necessary to determine the minimum concentration of oxidant which can be used without loss of activity. Taking the operating conditions mentioned above, various tests have been carried out with the concentration of oxidant being varied. The solvent used in these experiments is 2-butanol. The results are shown in FIG. 4, where the various conversion rates of DBT appear as a function of time, for ratios of oxidant/DBT of from 1 to 10.

The conclusion of these tests is that it is possible to work with ratios of oxidant/DBT of less than 10. In particular, a ratio equal to 4 is acceptable with no loss of activity, and a conversion of 70% can be achieved with a ratio of 2 which can make the process economically more attractive.

EXAMPLE C

Example of Isomerisation of Alkanes

This example illustrates the capacity of the catalysts according to the invention to selectively isomerise hexane into methylpentanes.

A mechanical mixture is produced using 80 mg of tungsten-containing zirconia according to the invention with 80 mg of platinum/silica (Pt/SiO$_2$). The reaction is carried out in the gas phase at 225° C., with a throughflow of hydrogen and nitrogen, with $D_T$=1.9 L/h, $P_{H2}$=5.60 kPa and $P_{Hexane}$=5.47 kPa.

Figure 5:
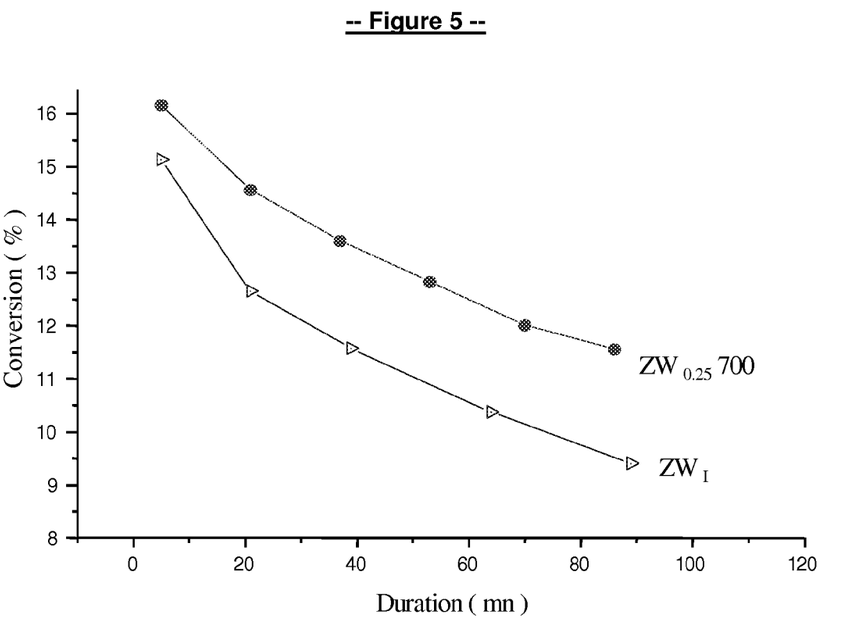
FIG. 5 represents the evolution of the conversion of alkanes as a function of time with two catalysts $ZW_{o2s}700$ and $ZW_1$.

The reaction takes place by means of bifunctional catalysis and, under the reaction conditions, the rate is limited by the acid function. This test therefore allows the strongest acidity to be found (see FIG. 5) for the preparation claimed after calcination at a lower temperature (700° C. as opposed to 800° C. for ZW$_I$).

EXAMPLE D

Example of Epoxidation of Olefins 5 mmol of cyclohexene is epoxidised with 12.5 mmol of hydrogen peroxide and 0.1 g of catalyst Zr-3 described above, in 10 mL of methanol. The reaction is examined at 298 K and at 348 K and the results, after 1 hour of reaction, are shown in Table V below:

TABLE V

| Catalyst | Epoxidation yield (%) | Oxidant | Temperature (K) |
| --- | --- | --- | --- |
| Zr-3 | 9.8 | H$_2$O$_2$ | 298 |
| Zr-3 | 38.1 | H$_2$O$_2$ | 348 |
| Zr-3 | 27.9 | TBHP | 348 |

The products are epoxide alone at 298 K and cyclohexanediol at 348 K.

The invention claimed is:

1. A solid, comprising:
a support of zirconia and/or titanium dioxide; and
a single layer of tungsten of tetrahedral form deposited on the support, said single layer of tungsten of tetrahedral form being present in an amount between 15% to 25% by weight relative to the total mass of the support, wherein,
the solid is obtained by anion exchange between the zirconia and/or the titanium dioxide and peroxotungstic acid in an acid medium having a pH lower than 3 so that tungsten present in the solid consists essentially of tungsten of tetrahedral form.

2. The solid according to claim 1, wherein:
a) the tungsten has tetrahedral coordination before and after calcination; and
b) the specific surface-area of the solid, after heating to a temperature of less than 800° C., is between 50 and 300 m$^2$/g.

3. The solid according to claim 1, wherein:
a) the tungsten has a tetrahedral coordination, before and after calcination;
b) the specific surface-area of the solid, after heating to a temperature of less than 800° C., is between 50 and 300 m$^2$/g;
c) the solid has a total acidity, measured by means of adsorption of ammonia, of between 0.1 and 0.5 mmol/g, after heating to a temperature of less than 800° C.

4. The solid according to claim 1, wherein the support is a zirconia support.

5. The solid according claim 1, further comprising one or more metals selected from the group consisting of platinum, rhodium, cobalt, palladium, nickel and iron.

6. The solid according to claim 1, having an activation and/or regeneration temperature less than 800° C.

7. A process for preparing the solid according to claim 1, wherein a single layer of WO$_4^{2-}$ ions is deposited on the zirconia support.

8. A process according to claim 7, comprising the steps of:
oxidising tungstic acid into peroxotungstic acid (H$_2$W$_2$O$_{11}$); exchanging anions in an acid medium of less than pH 3 between the solution of peroxotungstic acid obtained in this manner and a hydrated zirconia (ZrO$_2$) and/or hydrated titanium dioxide (TiO$_2$) support; and
recovering the tungsten/zirconia and/or titanium dioxide solid.

9. Process according to claim 7, comprising the steps of:
oxidising hydrated tungsten trioxide (WO$_3$) in the presence of an oxidation agent;
exchanging anions in an acid medium less than pH 3 between the solution of peroxotungstic acid obtained in this manner and a hydrated zirconia (ZrO$_2$) and/or titanium dioxide (TiO$_2$) support; and
recovering the tungsten/zirconia and/or the titanium dioxide solid.

10. A method of catalyzing reactions of oxidation, epoxidation, hydrodesulphuration, isomerisation of paraffins and olefins, hydrogenation of aromatic compounds, oxidation of sulphurous compounds or olefins, said method comprising using the solid according to claim 1 as the catalyst in said rections.

11. The method according to claim 10, wherein the catalysed reaction is an acid-catalysed reaction.

12. The method according to claim 10, wherein the reaction is a catalytic oxidation reaction of sulphurous derivatives present in hydrocarbons, before or after refinement.

13. The method according to claim 10, wherein said reaction is for desulphurising hydrocarbons and fuels, petroleums, kerosenes and gas oils.

14. The method according to claim 10, wherein the reaction is a catalytic oxidation reaction of benzothiophenes and/or dibenzothiophenes, substituted or non-substituted.

15. The solid according to claim 2, wherein the temperature of said heating is less than 700° C.

16. The solid according to claim 15, the temperature of said heating is less than 600° C.

17. The solid according to claim 2, wherein the specific surface-area of the solid, after said heating, is between 65 and 200 m$^2$/g.

18. The solid according to claim 17, wherein the specific surface-area of the solid, after said heating, is between 86 and 150 m$^2$/g.

19. The solid according to claim 3, wherein the temperature of said heating in b) is less than 700° C.

20. The solid according to claim 19, wherein said heating in b) is at a temperature less than 600° C.

21. The solid according to claim 3, wherein the specific surface-area of the solid, after said heating, is between 65 and 200 m$^2$/g.

22. The solid according to claim 21, wherein the specific surface-area of the solid, after said heating, is between 86 and 150 m$^2$/g.

23. The solid according to claim 3, wherein the total acidity in c) is between 0.2 and 0.4 mmol/g.

24. The solid according to claim 23, wherein the total acidity in c) is between 0.2 mmol/g and 0.4 mmol/g.

25. The solid according to claim 24, wherein the total acidity in c) is approximately 0.35 mmol/g.

26. The solid according to claim 24, wherein said heating in c) is at a temperature less than 700° C.

27. The solid according to claim 24, wherein said heating in c) is at a temperature less than 600° C.

28. The solid according to claim 6, having an activation and/or regeneration temperature less than 700° C.

29. The solid according to claim 28, having an activation and/or regeneration temperature less than 600° C.

30. The solid according to claim 1, wherein the solid produces a Raman spectrum having a line of resonance at about 935 $cm^{-1}$, lines of resonance towards 800 $cm^{-1}$ and 1000 $cm^{-1}$, which are characteristic of octahedral tungsten and microcrystals of tungsten, being absent from the Raman spectrum.

* * * * *